Figure 1:
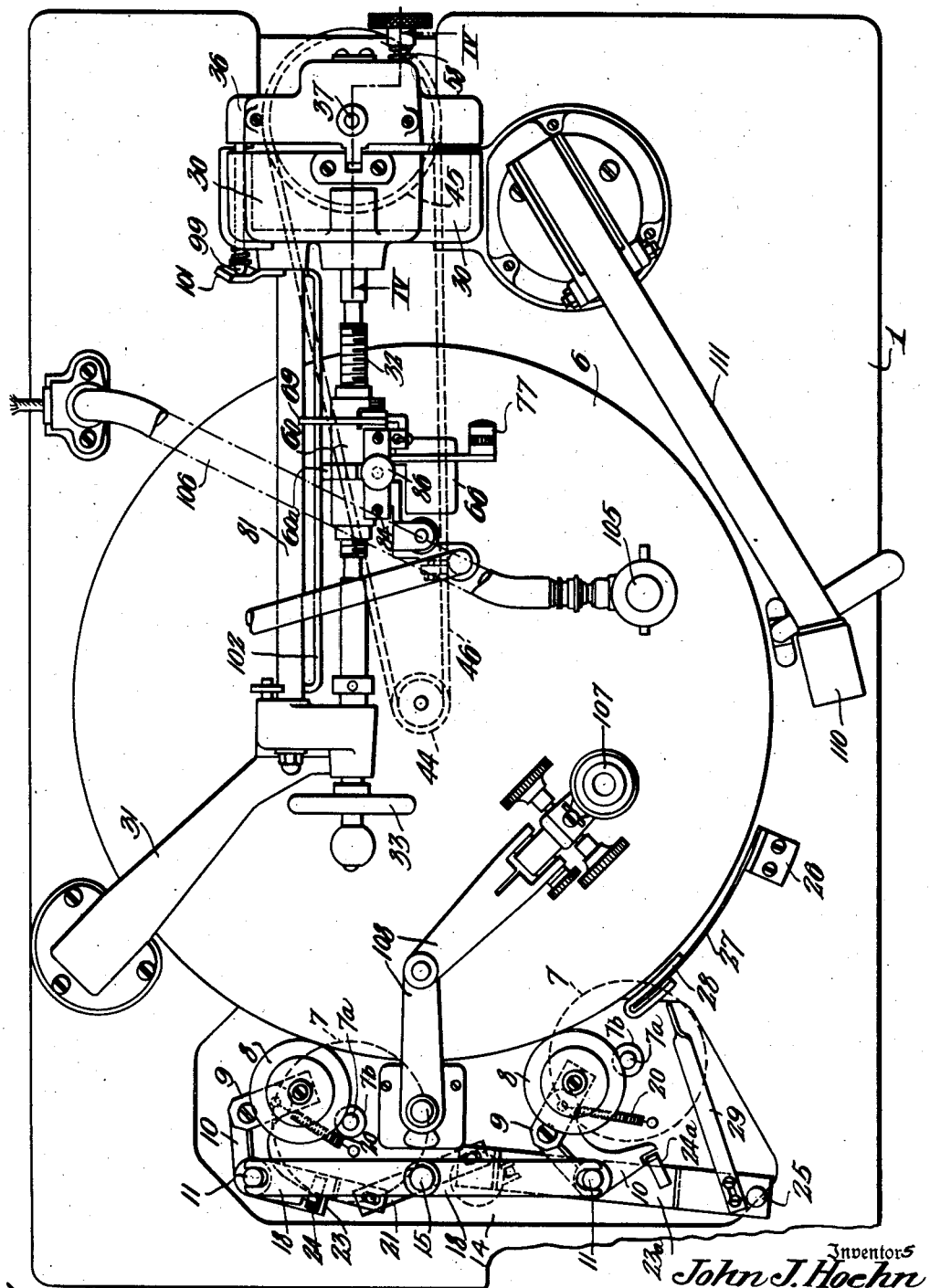

June 6, 1944. J. J. HOEHN ET AL 2,350,682
PHONOGRAPHIC APPARATUS
Filed July 31, 1940 6 Sheets-Sheet 1

Inventors
John J. Hoehn
& Arthur G. Zimmerman
By
Attorney

June 6, 1944.  J. J. HOEHN ET AL  2,350,682
PHONOGRAPHIC APPARATUS
Filed July 31, 1940  6 Sheets-Sheet 3
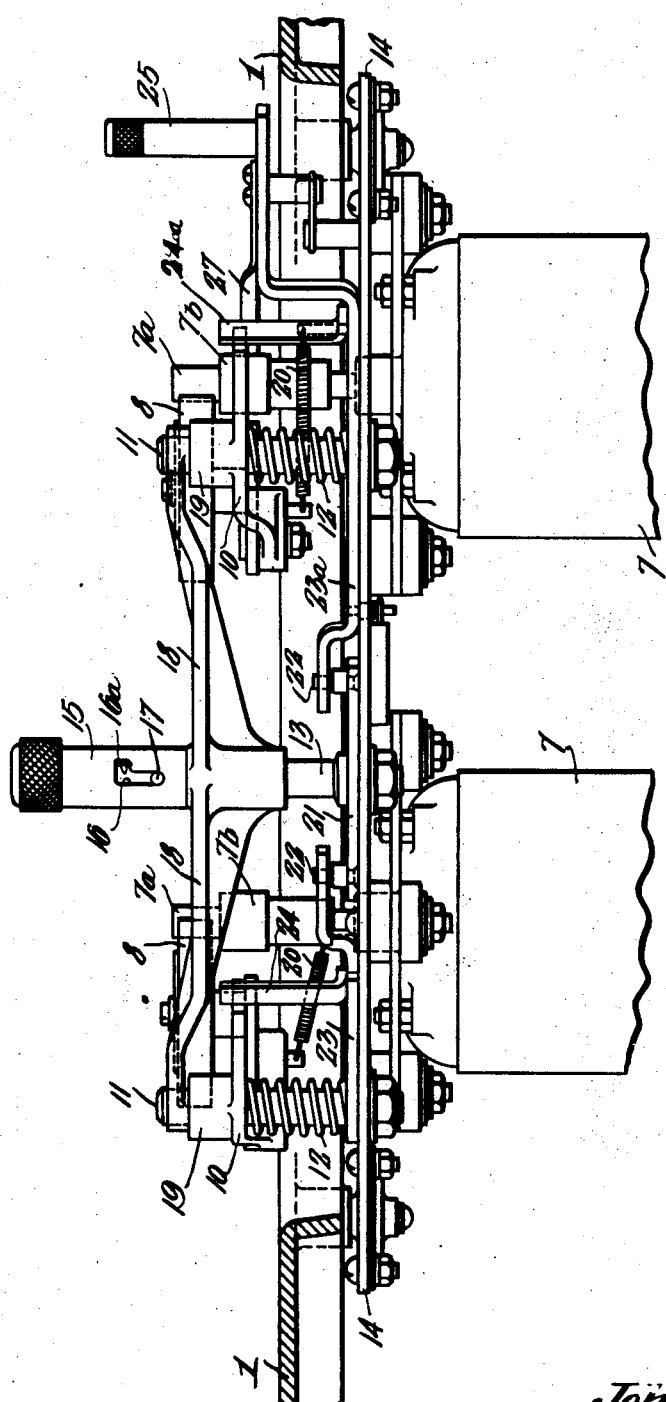
Fig. 3.
Inventors
John J. Hoehn
& Arthur G. Zimmerman
Attorney

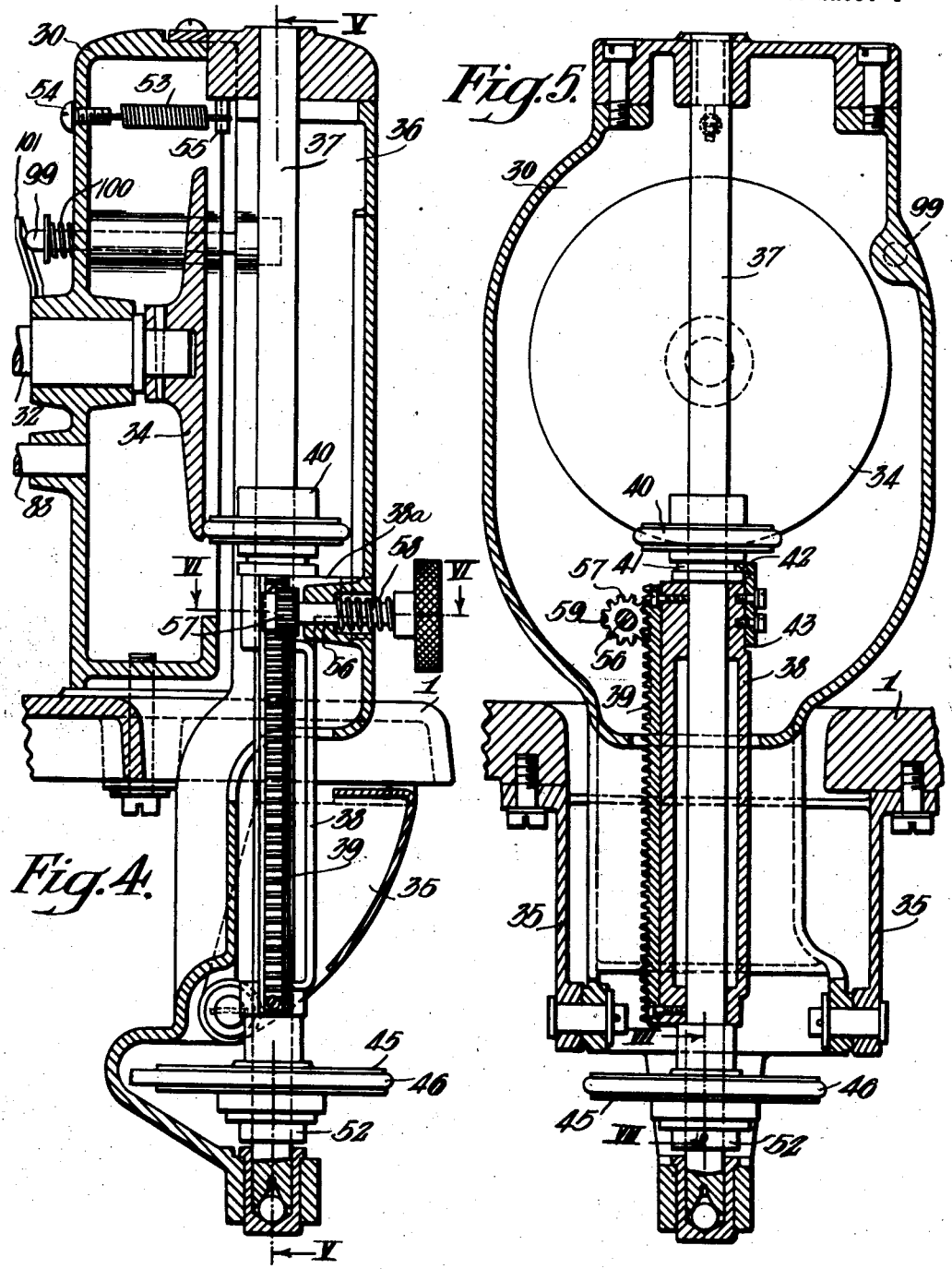

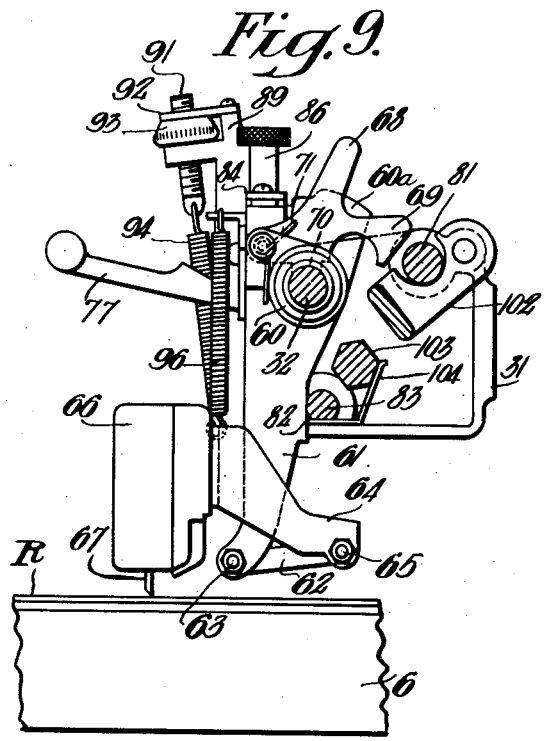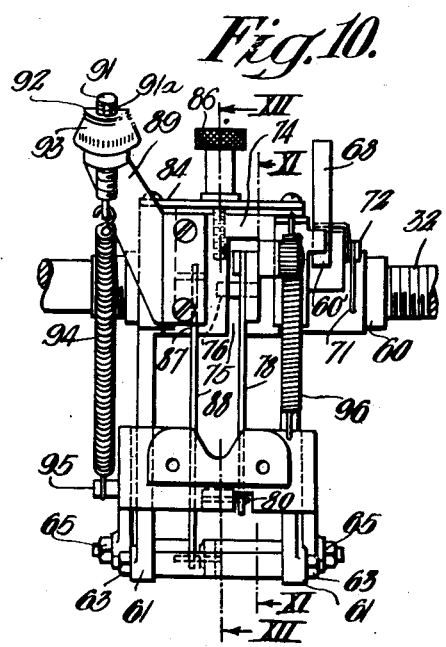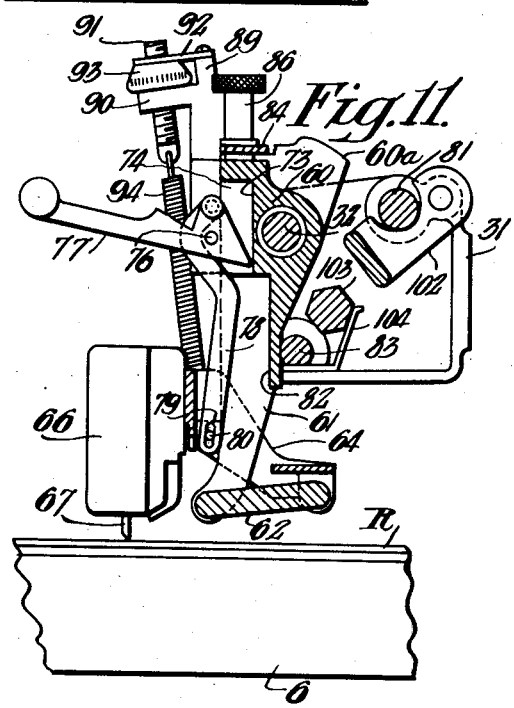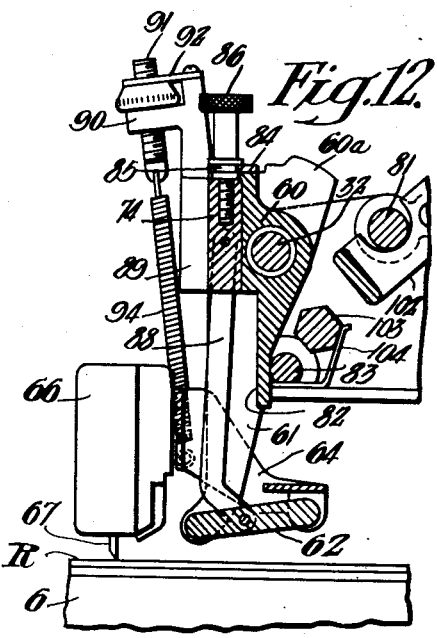

Patented June 6, 1944

2,350,682

UNITED STATES PATENT OFFICE 2,350,682

PHONOGRAPHIC APPARATUS

John J. Hoehn and Arthur G. Zimmerman, Indianapolis, Ind., assignors to Radio Corporation of America, a corporation of Delaware Application July 31, 1940, Serial No. 348,860

13 Claims. (Cl. 274—9)

This invention relates to phonographic apparatus, and more particularly to recording machines of the type adapted to record sound upon a blank disc for immediate play-back, the present invention being, in some respects, in the nature of an improvement over those disclosed in the copending applications of Raymond F. Brady and Paul Weathers, Serial No. 260,282, filed March 7, 1939, now Patent No. 2,260,289, granted October 28, 1941, Frank E. Runge, Serial No. 337,994, filed May 31, 1940, now Patent No. 2,254,048, granted August 26, 1941, and Frank E. Runge, Serial No. 343,116, filed June 29, 1940, now Patent No. 2,262,148, granted November 11, 1941, all assigned to Radio Corporation of America.

The primary object of our present invention is to provide an improved recording apparatus which possesses most of the advantages of the apparatus disclosed in the aforementioned copending applications and which, in addition, includes a number of novel features not found therein.

More particularly, it is an object of our present invention to provide an improved recording apparatus in which the cutter head may be fed either from the periphery of a record disc toward the center to provide what is termed "outside-in" recording, or fed from the center toward the periphery thereof to provide what is usually referred to as "inside-out" recording.

Another object of our invention is to provide an improved recording apparatus as aforesaid wherein the cutter head may be fed across the record at any selected one of a plurality of different speeds regardless of the direction of feed of the cutter to thereby provide grooves of different pitch.

Still another object of our invention is to provide improved recording apparatus as above set forth wherein the adjustment of the pitch of the groove may be made while the turntable is rotating at a predetermined speed and without altering the speed thereof.

A further object of our present invention is to provide an improved recording apparatus wherein it is possible to cut a terminal groove of either the concentric or spiral type, at will, and wherein it is also possible to provide connecting grooves of any desired pitch between different portions of the sound grooves.

Still a further object of our invention is to provide an improved recording apparatus wherein the turntable may be driven very constantly or uniformly at any one of a plurality of different speeds and wherein the turntable can be brought to a quick stop when the motor power is disconnected therefrom.

Another object of our present invention is to provide an improved timing scale for both "inside-out" and "outside-in" recordings and by means of which the operator can tell, at a glance, the recording time that is available on the unused portion of the record.

Still another object of our invention is to provide, in recording apparatus of the type set forth above, an improved cutter head mounting by means of which the depth of the cutting stylus and the angular relation of the cutting stylus with respect to the record blank can be independently adjusted and wherein the depth of cut is not altered when changing the angle of cut.

It is also an object of our present invention to provide an improved, de luxe recording apparatus as aforesaid which incorporates such features as means for enabling the close scrutinization and examination of the cut grooves, means for adequately illuminating the recording area, means for removing shavings cut from the record blank, etc., and which is both highly efficient in use and relatively inexpensive in cost.

In accordance with one form of our invention, we provide a friction disc on one end of the feed screw which feeds the cutter across the record blank and rotate this disc by a rubber-tired friction wheel mounted at right angles to said disc, the friction wheel being keyed to and freely adjustable on a shaft extending at right angles to the feed screw and receiving power from said shaft. The turntable is preferably driven from the periphery by a pair of drives of the type disclosed and claimed in the aforementioned Brady and Weathers patent, a turntable brake operable by the control handle which controls the turntable driving mechanism having been added to quickly stop rotation of the turntable when the dual drive is disconnected therefrom.

Power is transferred from the turntable shaft to the aforementioned friction wheel shaft by a suitable pulley and belt arrangement, the rotation of the friction wheel being constant. The speed of the disc on the feed screw can be varied by moving the friction wheel on its keyed shaft and along a diameter of the driven disc. Rotation of the feed screw disc is reversed when the friction wheel is moved past the center of the feed screw disc. The friction wheel may be moved along its keyed shaft by means of a rack and pinion and it may be locked in a predetermined position relative to the driven disc by engaging the pinion with a second, stationary rack or a fixed pin.

The drive between the turntable and the transmission constituted by the aforementioned feed screw disc and friction wheel includes a clutch which permits rotating the feed screw manually to advance the cutter at a rate other than that determined by the aforementioned transmission coupling, and we provide manually operable means for disconnecting the transmission coupling, if desired. This latter means also serves to disconnect the rubber tired wheel from its associated disc to prevent "flats" from forming on the rubber tire when the machine is at rest.

We also provide a cam mechanism which is responsive to movement of the cutter head into a rest position (that is, out of operative relation with the record) for actuating a spring pressed pin associated with the frame members in which the transmission coupling is mounted to separate or disconnect the elements of the transmission coupling in a manner similar to the aforementioned manually operable means.

A suitable lamp may be mounted on the machine in a manner to permit adjustment thereof to any desired position over the record whereby to illuminate the portions thereof at which the recording takes place. Also, a suitable microscope may be provided adjacent the turntable on a bracket which permits adjustment thereof across the record whereby the cut groove may be examined closely for proper depth, width, pitch, etc., and a suitable pipe or hose connected to the cutter carriage in close proximity to the cutting needle may be connected to a suitable suction line for removing the shavings as they are formed.

The cutter head carriage is pivotally mounted on a suitable mounting sleeve carried by the feed screw, the mounting member carrying a sliding block which is connected to the carriage through a suitable link. Adjustment of the block on the mounting member effects a change in angularity between the cutting needle and the surface of the record blank. The slidable block carries an adjustable member which is connected to the cutter head carriage by means of a spring, adjustment of said member varying the depth of cut of the needle.

Because of (1) the way the cutter head carriage is pivotally mounted on the mounting member and (2) the way the adjustable member for varying the depth of cut of the stylus is carried by the slidable block, once the cutting needle has been set for a predetermined depth of cut, a change in the angularity thereof with respect to the record will not affect this depth, neglecting minute frictional differences in pivots, spring anchors, etc.

Figure 2:
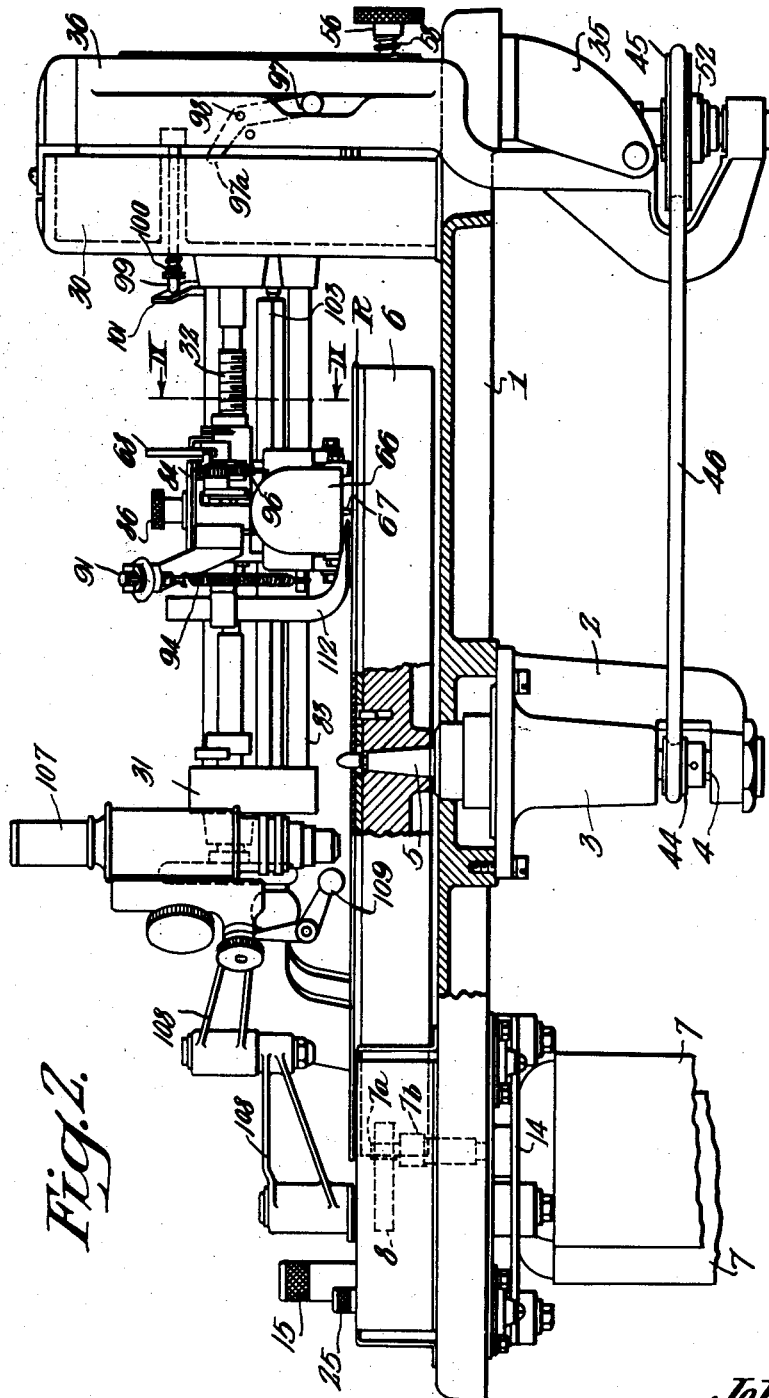
Figure 6:
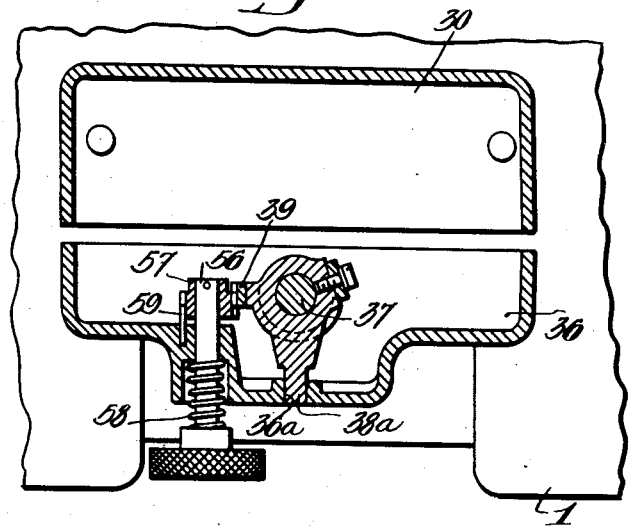
Figure 7:
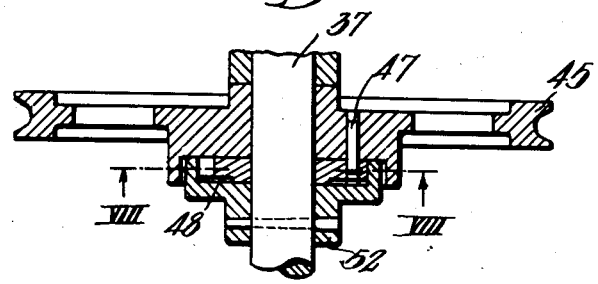
Figure 8:
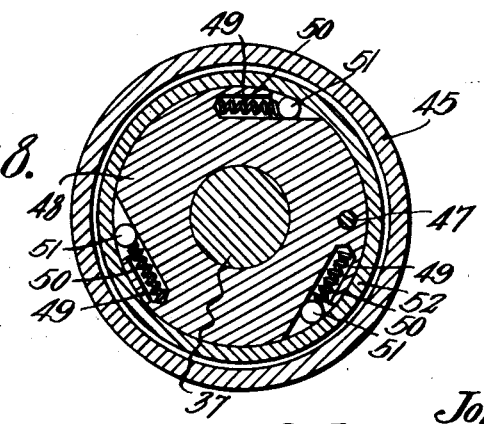

The novel features that we consider characteristic of our invention are set forth with particularity in the appended claims. The invention itself, however, both as to its organization and method of operation, together with additional objects and advantages thereof, will best be understood from the following description of one embodiment thereof, when read in connection with the accompanying drawings, in which Figure 1 is a top plan view of a recording apparatus according to our invention, Figure 2 is a front elevation thereof with certain parts in section, Figure 3 is an enlarged side elevation of the turntable driving mechanism, Figure 4 is a sectional view taken on the line 4—4 of Fig. 1, Figure 5 is a sectional view taken on the line 5—5 of Fig. 4, Figure 6 is a sectional view taken on the line 6—6 of Fig. 4, Figure 7 is a sectional view taken on the line 7—7 of Fig. 5, Figure 8 is a sectional view taken on the line 8—8 of Fig. 7, Figure 9 is a sectional view taken on the line 9—9 of Fig. 2, Figure 10 is a front elevation of the cutter head carriage and mounting with the cutter head removed, Figure 11 is a sectional view taken on the line 11—11 of Fig. 10, and Figure 12 is a sectional view taken on the line 12—12 of Fig. 10.

Referring more particularly to the drawings, wherein similar reference characters designate corresponding parts throughout, there is shown a motor board 1 carrying a frame member 2 provided with a bushing 3 in which is journalled a turntable shaft 4 terminating in a tapered spindle 5 on which is mounted a turntable 6, the turntable constituting a supporting means for a record disc or blank R. The turntable 6 is driven from a pair of motors 7, each of which includes a motor shaft formed with a relatively small diameter 7a at its upper extremity and a relatively large diameter 7b immediately below the portion 7a. In each case, the motor may be coupled to the periphery of the turntable 6 by means of a rubber tired idler 8 which is floatingly carried on an arm 9, each arm 9 being pivotally mounted on a lever 10 which, in turn, is pivoted on a post 11, a coil spring 12 around each of the posts 11 constantly urging the associated lever 10 to an elevated position.

When the lever 10 is in the elevated position shown in Fig. 3, the friction idler 8 may be brought into engagement with the smaller diameter portion 7a of the motor shaft and the periphery of the turntable to drive the turntable at a relatively slow speed, for example, 33⅓ R. P. M.; and when the lever 10 is depressed against the action of the spring 12 to a point where the friction idler 8 is on the level of the larger diameter portion 7b of the motor shaft, and the friction wheel 8 is then brought into engagement with the shaft portion 7b and the turntable periphery, the turntable will be driven at a relatively higher speed, for example, 78 R. P. M. This particular driving mechanism constitutes the subject matter of the above mentioned Brady and Weathers patent and is therein disclosed and claimed in greater detail.

For adjustment of the levers 10 on their respective posts 11, we provide a post 13 on a motor plate 14 which is carried by the motor board 1 and, in turn, carries the motors 7, and we slidably and rotatably mount a sleeve 15 on the post 13. The sleeve 15 is provided with a bayonet slot 16 through which a pin 17 on the post 13 extends, the sleeve 15 being also provided with a pair of oppositely extending arms 18 which are bifurcated at their ends to receive the upper ends of the posts 11 and against which the springs 12 hold the upper ends of the collars 19 formed on the levers 10. With the sleeve 15 in the position shown in Fig. 3, wherein the pin 17 is in the vertical portion of the bayonet slot 16, the springs 12 are free to elevate the levers 10 to a position wherein the friction idlers 8 are in alignment with the smaller diameter motor shaft portions 7a. On the other hand, by depressing the sleeve 15 on the post 13 until the horizontal portion of the bayonet slot 16 engages the pin 17, the levers 10 are forced down against the action of the springs 12 to bring the idler wheels 8 in alignment with the larger diameter motor shaft portions 7b. The sleeve 15 may be locked in the latter position by simply turning it slightly in a clockwise direction (looking down from the top) to cause the portion 16a of the bayonet slot 16 to embrace the pin 17. A pair of coil springs 20 each fixed at one end to the motor plate 14 and at its other end to a downwardly extending lug on the respective arms 9 constantly urges each of the associated idlers into engagement with the motor shafts and the turntable.

To enable disconnecting the idler wheels 8 from their respective motor shafts and the turntable, a lever 21 is pivoted on the post 13 and has fixed at its ends a pair of upstanding pins 22 received in slots formed in the ends of a pair of levers 23 and 23a, each pivotally mounted on a separate one of the posts 11. The lever 23 is provided with an upstanding member 24 which is arranged to engage the associated lever 10, and the lever 23a is provided with a similar upstanding member 24a which is arranged to engage its associated lever 10, the lever 23a being also provided with an operating handle 25. By moving the handle 25 in a counterclockwise direction, as viewed in Fig. 1, the lever 23a moves with it in a counterclockwise direction to bring its member 24a into engagement with the associated lever 10 and cause the latter to move in a counterclockwise direction about the shaft 11 to force the friction idler 8 out of engagement with the associated motor shaft and the turntable against the action of the connected spring 20. At the same time, counter-clockwise movement of the lever 23a effects clockwise movement of the lever 21 on the post 13, and this, in turn, effects counterclockwise movement of the lever 23 and the lefthand lever 10 to bring its associated friction idler 8 out of engagement with the associated motor shaft and the turntable. Once the idlers 8 have been uncoupled from the respective motors and the turntable, the sleeve 15 may be adjusted on the post 13 to bring the idlers to the level of either the motor shaft portion 7a or the motor shaft portion 7b in the manner heretofore described, after which the operating handle 25 is moved in the opposite direction from that previously indicated whereupon the reverse action from that heretofore described takes place and the springs 20 pull their respective idlers 8 into engagement with the motor shafts and the turntable periphery.

Fixed to the motor board 1 in proximity to the turntable 6 is a bracket 26 which carries a spring blade 27 having a friction lining 28 secured thereto. An arm 29 is adjustably mounted on the lever 23a and extends laterally from the lever 23a toward the spring blade 27, there being a suitable clearance between the spring 27 and the adjacent end of the arm 29. When the lever 23a is turned in a counter-clockwise direction, as viewed in Fig. 1, to disconnect the idlers 8 from the motors 7 and the turntable 6, the right-hand end of the arm 29 will engage the free end of the blade 27 and press the brake lining against the turntable periphery to bring the turntable to a quick stop. This is very desirable, in many instances, since the turntable is very massive and would otherwise continue to rotate for a considerable period.

Fixed to the motorboard 1 at one side of the turntable 6 is a frame member or casing 30 which cooperates with a bracket 31 also secured to the motor board 1 to provide journal bearings for a feed screw 32, the feed screw extending over the turntable 6 and extending through the bearings in the casing 30 and the bracket 31. A hand wheel 33 is secured to the feed screw 32 at the end thereof which protrudes beyond the bracket 31, and a disk 34, housed within the casing 30, is secured to the opposite end of the feed screw 32. Pivotally mounted on a downwardly extending bracket 35 on the motor board 1 is a second frame member or casing 36 which rotatably carries a shaft 37, a frame 38 having a rack 39 secured thereto being slidably carried by the shaft 37 and being prevented from rotation thereon by reason of the fact that a projection 38a on the frame 38 is received in a slot 36a in the casing 36. Also slidably carried on the shaft 37 is a rubber-tired friction wheel 40 which is splined to the shaft 37 for rotation therewith, the lower end of the hub of the friction wheel 40 being formed with an annular groove 41 which receives the offset end 42 of an L-shaped locking plate or the like 43 secured to the frame 38.

Fixed to the lower end of the turntable shaft 4 is a pulley 44 and loosely carried on the lower end of the shaft 37 is a second pulley 45, a belt 46 connecting these two pulleys. A pin 47 extends through the hub of the pulley 45 and through a clutch plate 48 constituting the male element of a suitable clutch provided with a plurality of circumferentially spaced bores 49 each carrying a coil spring 50 and a ball 51. The associated spring of each ball 51 constantly tends to force it outwardly against a cylindrical female element 52 of the clutch, the latter clutch element being secured to the shaft 37 for rotation therewith. It will now be obvious, from the foregoing description, that power may be transmitted from the motors 7 through the friction idlers 8, the turntable 6 and its shaft 4, the pulley 44, the belt 46, the pulley 45, the pin 47 and clutch 48—52 to the shaft 37 which drives the friction wheel 40. A coil spring 53 secured at one end to a screw 54 on the casing 30 and at its other end to a downwardly extending pin 55 on the casing 36 constantly tends to hold the friction wheel 40 in engagement with the disk 34. Thus, under normal conditions, the friction wheel 40 drives the disk 34, thereby imparting rotation to the feed screw 32.

Rotatably carried by the casing member 36 is a small shaft 56 which carries a pinion 57 in constant engagement with the rack 39 (see Figs. 4, 5 and 6). The shaft 56 is also slidable on the casing 36 and is constantly urged in an outward direction by a coil spring 58. In the extreme outward position of the shaft 56, its pinion 57 receives a pin 59 between adjacent teeth thereof to hold the pinion against rotation. However, the shaft 56 may be pushed inwardly against the spring 58 to free the pinion 57 from the locking pin 59 to permit rotation of the shaft 56, and rotation of the shaft 56 and its pinion 57 will, of course, effect movement of the rack 39 and the frame 38 together with the friction wheel 40 along the shaft 37. In this way, the friction wheel 40 may be adjusted along the vertical diameter of the friction disk 34.

For a predetermined speed of rotation of the turntable 6, as determined by the position of the friction idlers 8 relative to the motor shaft portions 7a and 7b, it is obvious that the friction wheel 40 will rotate at a fixed speed, and the speed of rotation which it will impart to the disk 34 will depend upon the radius on the disk 34 at which it engages the latter. With the friction wheel 40 at its lowermost position, as shown in Figs. 4 and 5, the friction wheel 40 will drive the disk 34 at the slowest speed in a counterclockwise direction, as seen in Fig. 5. The nearer the friction wheel 40 is adjusted toward the center of the disk 34 along the lower vertical radius thereof, the faster will be the speed of the feed screw 32 in a counterclockwise direction. When the friction wheel 40 has been adjusted past the center of the disk 34 to engage the disk 34 along the upper vertical radius thereof, it will rotate the feed screw 32 in the opposite, or clockwise, direction as seen in Fig. 5, and the speed of rotation imparted to the feed screw 32 will depend upon the point of engagement between the friction wheel 40 and the disk 34 along the latter radius. Thus, it is apparent that the feed screw 32 may be rotated at any desired speed within the limits determined by the diameter of the disk 34 and the speed of rotation and the diameter of the friction wheel 40, in either a clockwise or a counterclockwise direction. Once the friction wheel 40 has been adjusted on the shaft 37 to the desired point of engagement with the disk 34, the shaft 56 may be released, whereupon the spring 58 will force the shaft outwardly until the pinion 57 has engaged the locking pin 59, and thus the friction wheel 40 is releasably locked in the adjusted position.

Slidably and rotatably carried by the feed screw 32 is a mounting sleeve 60 having a pair of downwardly extending, parallel arms 61 which pivotally carry a rocker 62 on the pivot bearings 63. A bracket 64 is pivotally mounted on the bearing elements 65 carried by the rocker 62 and has secured thereto a sound translating device 66, such as a cutter head provided with a cutting stylus 67 adapted to cooperate with a record blank R on the turntable 6 and to cut a sound groove therein.

Pivotally mounted on the mounting sleeve 60 within a transverse slot 60' therein of sufficient depth to expose a few threads of the feed screw 32 is a latch lever 68 provided with a latching toe 69 and formed with a half nut 70 (see Fig. 9) adapted to cooperate with the feed screw 32. A biasing spring 71 wrapped around the pivot pin 72 of the latch lever 68 and having one end fixed to the mounting sleeve 60 and its other end secured to the lever 68 constantly urges the half nut 70 into engagement with the feed screw 32. Thus, upon rotation of the feed screw 32, motion is imparted to the mounting sleeve 60 and the cutter head 66 across the record R by cooperation of the half nut 70 therewith, the rate at which the cutter head 66 is fed across the record R and the direction of feed being determined, of course, by the position of the friction wheel 40 on the disk 34.

The mounting sleeve 60 is provided with a recess 73 in which is slidably mounted a block 74, itself formed with a recess 75, and pivotally mounted within the recess 75 on a pin 76 is an operating handle 77. A link 78 has one end pivotally connected to the handle 77 eccentrically to the pivot pin 76 and, at its other end, the link 78 is formed with an elongated slot 79 which receives a pin 80 on the bracket 64. When the handle 77 is in its lowered position, as shown in Figs. 9 and 11, the cutting stylus 67 is in engagement with the record R. To raise the stylus 67 from the record R, the handle 77 is moved upwardly, whereupon the link 78 is raised until the play in the slot 79 is taken up and the lower end of the slot 79 engages the pin 80 to thereafter rotate the bracket 64 on its pivots 65 and thereby raise the cutter head 66 slightly from the record R. Continued movement of the handle 77 in an upward direction will cause the handle to engage the front, upper edge of the mounting member 60 and to rotate the entire assembly about the feed screw 32, bringing the latching toe 69 into engagement with a rod 81 carried by the frame member 30 and the bracket 31 to cam the half nut 70 out of engagement with the feed screw 32. Continued rotation of the assembly on the feed screw 32 will eventually bring the latching toe 69 past the rod 81, whereupon the spring 71 will force the lever 68 downwardly and the toe 69 will latch around the rod 81 to hold the assembly in a fully raised position with the cutter head 66 remote from the record R. When it is desired to replace the cutter 67 on the record, the latching toe 69 is released from the rod 81 manually and the entire assembly is rotated on the feed screw in the reverse direction until a web 82 on the mounting sleeve 60 engages a second rod 83 carried by the frame member 30 and the bracket 31, whereupon further downward movement of the assembly is prevented. Thereafter, the handle 77 may be lowered to bring the cutter 67 into engagement with the record.

Secured to the top of the mounting sleeve 60 is a plate 84 provided with a slot in which is received the annular groove 85 of an adjusting screw 86, the lower end of the screw 86 being threaded into the block 74. By rotating the screw 86 on the plate 84, the block 74 will be slid up or down, as the case may be, within the recess 73. A second recess 87 in the block 74 receives a link 88 the upper end of which is pivotally connected to the block 74 and the lower end of which is pivotally connected to the rocker 62. When the block 74 is raised or lowered by turning the screw 86 in one direction or the other, it will also correspondingly raise or lower the link 88 which, in turn, will cause the rocker 62 to rotate on its pivot bearings 63. Since the pivot bearings 63 are fixed, rotation of the rocker 62 thereon will raise or lower the pivot bearings 65, as the case may be, which will cause the bracket 64, the cutter head 66 and the needle 67 to tilt about the point of contact of the needle 67 with the record R as a center and, in this way, change the angular relation between the needle 67 and the surface of the record R.

Secured to the slidable block 74 is a bracket 89 formed with an extension 90 in which is threadedly received a screw 91, the screw 91 being held against rotation in any suitable way, as by forming the upper end thereof with a flat surface 91a and extending the same through a correspondingly formed opening in a plate 92 secured to the upper end of the bracket 89. The screw 91 is threaded into a thumb nut 93 which is held between the extension 90 and the plate 92, a spring 94 connecting the lower end of the screw 91 with a pin 95 on the cutter head bracket 64. Adjustment of the screw 91 by rotating the thumb nut 93 will vary the tension in the spring 94 and thereby slightly raise or lower the bracket 64 on its pivot bearings 65 to thereby alter the depth of cut of the stylus 67 in the record. Since the bracket 89 is carried by the slidable block 74 and the bracket 89, the spring 94 and the cutter head bracket 64 can all move as a unit relative to the bearing members 63, it is obvious that, once the thumb nut 83 is adjusted for a predetermined depth of cut of the stylus 67, subsequent adjustment of the screw 86 to alter the angle of cut will not alter the depth of cut. This is one great advantage which our present invention offers over the arrangement disclosed and claimed in the above identified copending application of Frank E. Runge, Serial No. 343,116, filed June 29, 1940, now Patent No. 2,262,148, granted November 11, 1941.

If the spring 94 alone were provided, the force applied by this spring would tend to produce an unbalanced load on the two pivot bearings 65, since it would tend to produce a torque on the bracket 84 in a clockwise direction, as viewed in Fig. 10. To counter-balance this tendency and also to reduce the load on the bearings 65, as well as to help prevent slight oscillations of the cutter head in a direction normal to the surface of the record R, a second spring 96 is provided which has one end fixed to the upper end of the mounting member 60 and its lower end secured to the bracket 84. This construction is more fully described and claimed in the copending application of John J. Hoehn, Serial No. 306,833, filed November 30, 1939, now Patent No. 2,255,-218, granted September 9, 1941.

When it is desired to make a recording, a blank disk R is placed on the turntable 6, the friction wheel 40 is adjusted to the desired position relative to the disk 34, and the idlers 8 are adjusted for engagement with either the motor shaft portions 7a or 7b and are then coupled to the selected ones of the latter and to the turntable periphery. As previously described, the friction wheel 40 may be preset relative to the disk 34 to drive the feed screw in either a clockwise or counterclockwise direction for feeding the cutter 66 either inwardly along the record R from the periphery thereof, or outwardly therealong from the center thereof. In practice, it has been found most advantageous to adjust the friction disk 40 to cause the cutter 67 to cut either 96, 112, 136 or 154 grooves per inch, regardless of whether it is cutting an "inside-out" or an "outside-in" groove, but the pitch of the cut groove need not be limited to these values. In any case, if, at some point in the recording, it is desired to cut a few turns of a groove of greater pitch (as, for example, to form a connecting spiral between two recorded portions) the hand wheel 33 may be manipulated in the direction of rotation of the feed screw 32 at a greater rate than is permitted by the pre-set coupling between the friction wheel 40 and the disk 34. This is possible by reason of the clutch coupling between the pulley 45 and the shaft 37 shown in detail in Fig. 8 and will be true regardless of the direction of rotation of the feed screw 32 at any particular time.

In some cases, it may be desired to form a circular groove instead of a spiral groove, as, for example, in the case of a concentric terminal groove or a concentric dividing groove between different portions of the recording. In such case, it is necessary to temporarily disconnect the friction wheel 40 from the disk 34, and for this purpose, a handle 97 is pivotally mounted on the pivot pin 98 on the frame member or casing 36. By turning the handle 97 in a counterclockwise direction, as viewed in Fig. 2, the inner end 97a thereof will engage the fixed frame member 30 and therefore force the frame member 36 away from the frame member 30 against the action of the connecting spring 53 sufficiently to disengage the friction wheel 40 from the disk 34. Since the feed screw 32 will then stop rotating, it is obvious that rotation of the turntable 6 and the record blank R under the cutter 67 will cause the cutter to form a concentric groove in the blank R. The handle 97 may also be availed of when the recording operation has been completed in order to disconnect the friction wheel 40 from the disk 34 so as to prevent "flats" from forming on the rubber tire of the wheel 40.

In order to insure the friction wheel 40 being disconnected from the disk 34 when the apparatus is not in use, we have provided a movable plunger 99 on the casing or frame member 30 which is constantly urged away from the casing member 36 and into engagement with the twisted end 101 of a U-shaped bracket 102 pivotally mounted on the frame 30 and the bracket 31. A projection 60a on the back of the mounting sleeve 60 is arranged to engage the horizontal cross-arm of the member 102 as the assembly constituted by the mounting sleeve 60 and the parts carried thereby are rotated to raise the cutter head 66 from the record and to bring the latching toe 69 into engagement with the rod 81. When the projection 60a engages the member 102, the latter is turned in a direction to cause its twisted end 101 to cam the plunger 99 toward the casing member 36 and force it away from the casing member 30, thereby separating the friction wheel from the disk 34.

From the foregoing description, it will be apparent to those skilled in the art that we have provided a novel recording apparatus which embodies a number of advantageous features. In addition to the advantages offered by the apparatus heretofore described, we preferably provide a scale bar 103 which is rotatably carried by the frame 30 and the bracket 31 and which is polygonal in cross-section. Each face of the polygon may be marked with indicia indicating the recording time or the recording space left on the record blank at any particular rotational speed of the feed screw 32, half of the faces thereof being marked for "outside-in" recording and the other half being marked for "inside-out" recording. A suitable index or reference mark 104 carried by the mounting sleeve 60 may be provided to cooperate with the various scales on the rod 103. Preferably, also, a suitable source of illumination 105 supported by a flexible cable 106 is provided to afford adequate illumination of the recording area on the record R, and a microscope 107 carried on a pair of adjustable brackets 108 may be employed to closely scrutinize the cut groove for depth, width, etc. An additional lamp and reflector 109 may be provided in conjunction with the microscope 107 to illuminate the cut grooves and lands in order to monitor the cutting more accurately. If desired, a suitable sound reproducing head 110 mounted on an arm 111 which is suitably pivoted on the motor board 1 may be provided to play back the recorded record immediately after recording. Also, there may be provided a nozzle 112 which may be attached to the mounting member 60 in close proximity to the cutting needle 67, the nozzle being connected through a flexible hose to suitable suction apparatus for removing the shavings cut from the blank R by the needle 67.

It will be apparent to those skilled in the art that our improved recording apparatus provides a very important advantage over those heretofore known, namely, "squeezing" or "expanding" the recorded groove at any time that it may be found necessary or desirable. Thus, for example, for a program of presumably fixed timing which is to be recorded, if there is a sudden change during the rendition of the program which, for example, necessitates recording more than was originally intended, the shaft 56 may be quickly manipulated to move the friction wheel 46 along the disk 34 to decrease the pitch of the recorded groove, whereupon, within a limited space on the record blank R still available for recording, more subject matter may be recorded than was originally intended. Similarly, the spacing between the grooves may be "expanded" by decreasing the number of grooves per inch where, for example, it is found necessary to record heavily modulated passages in the course of a low level or speech recording. Thus, it is apparent that, with our improved recording apparatus, it is possible to continuously vary the pitch of the recorded groove at will, or as circumstances necessitate, and this may be done while the turntable continues to rotate at its preset speed and without shutting off the apparatus to make the necessary adjustments.

Although we have shown and described but one embodiment of our invention, it will be apparent to those skilled in the art that many other modifications thereof, and various changes in the particular modification described, are possible within the spirit of our invention. We therefore desire that our invention shall not be limited except insofar as is made necessary by the prior art and by the spirit of the appended claims.

We claim as our invention:

1. In phonographic apparatus, the combination of means for supporting a record, a sound translating device, means movably supporting said device for movement into and out of operative relation with a record on said supporting means, means including a driving member and a driven member for feeding said device across the record, means for moving said device out of operative relation with the record and means responsive to said last named means after movement of said device out of operative relation with the record for disconnecting said driving and driven members.

2. In phonographic apparatus, the combination of means for supporting a record, means for rotating said supporting means, a sound translating device, means movably supporting said device for movement into and out of operative relation with a record on said supporting means, means including driving and driven members for feeding said device across the record, means coupling said driving member to said supporting means for delivering power from said supporting means upon rotation thereof to said driving member, means for moving said device out of operative relation with the record, and means responsive to said last named means after movement of said device out of operative relation with the record for disconnecting said driving and driven members while said record supporting means continues to rotate in response to said second named means.

3. In phonographic apparatus, the combination of means for supporting a record, means for rotating said supporting means, a sound translating device, means movably supporting said device for movement into and out of operative relation with a record on said supporting means, means including frictionally coupled driving and driven members for feeding said device across the record, means coupling said driving member to said supporting means for delivering power from said supporting means upon rotation thereof to said driving member, means for moving said device out of operative relation with the record, and means responsive to said last named means after movement of said device out of operative relation with the record for breaking the friction coupling between said driving and driven members while said record supporting means continues to rotate in response to said second named means.

4. In phonographic apparatus, the combination of means for supporting a record, means for rotating said supporting means, a sound translating device, means movably supporting said device for movement into and out of operative relation with a record on said supporting means, means including a variable speed transmission for feeding said device across the record, means coupling one element of said transmission to said supporting means for delivering power from said supporting means to said transmission upon rotation of said supporting means, means for moving said device out of operative relation with the record, and means responsive to said last named means after movement of said device out of operative relation with the record for rendering said transmission temporarily inoperative while said record supporting means continues to rotate in response to said second named means.

5. The invention set forth in claim 4 characterized by the addition of manually actuable means operable at will for rendering said transmission inoperative independently of said movement responsive means.

6. In phonographic apparatus, the combination of a turntable, means for rotating said turntable, a feed screw extending over said turntable, a sound translating device carried by said feed screw for both longitudinal and rotational movement thereon relative to a record on said turntable, means including a pair of friction elements constituting a variable speed transmission for rotating said feed screw to move said device therealong and across the record, means coupling said turntable to the driving element of said transmission for delivering power thereto from said turntable, means for moving said device out of operative relation with the record, and means responsive to said last named means after removal of said device from the record for disconnecting said elements and rendering them temporarily inoperative to rotate said feed screw while said turntable continues to rotate in response to said first named means.

7. In phonographic apparatus, the combination of means for supporting a record for rotation, a feed screw extending thereover, a carriage mounted on said feed screw for both longitudinal and rotational movement thereon relative to the record, a friction transmission coupled to said feed screw for delivering power thereto, a fixed frame member and a relatively movable frame member, the driving element of said transmission being carried by said movable frame member and the driven element thereof being carried by said fixed frame member, means for moving said movable frame member away from said fixed frame member whereby to disconnect said elements, and means responsive to rotation of said carriage on said feed screw for actuating said last named means.

8. The invention set forth in claim 7 characterized in that the means for moving said movable frame member comprises a pin carried by said fixed frame member and arranged to engage said movable frame member, and characterized further in that said actuating means includes a cam for actuating said pin in a direction to force said movable frame member away from said fixed frame member.

9. The invention set forth in claim 7 characterized in that the means for moving said movable frame member comprises a pin carried by said fixed frame member and arranged to engage said movable frame member, characterized further in that said actuating means comprises a pivoted member having a cam thereon for actuating said pin in a direction to force said movable frame member away from said fixed frame member, and characterized still further in that said carriage is provided with means for engaging said pivoted member upon rotation of said carriage on said feed screw to cause said cam to actuate said pin.

10. In phonographic apparatus, the combination of means for supporting a record for rotation, a sound translating device operatively associated therewith, and means including a variable speed transmission for feeding said device across a record at any preselected one of a plurality of different speeds, said transmission comprising a pair of friction discs angularly related to each other and with the periphery of one engaging a face of the other of said discs, said discs being mounted for relative movement with respect to each other along a diameter on said face, the adjustment of said discs along the radius to one side of the center of said face effecting the feeding of said device at a variable speed and in one direction across said supporting means, and the adjustment of said discs along the radius on the other side of said face center effecting the feeding of said device at a variable speed across said supporting means in the opposite direction.

11. The invention set forth in claim 10 characterized by the addition of means for releasably locking said discs to each other in any predetermined position to which said discs may be adjusted.

12. The invention set forth in claim 10 characterized by the addition of means constantly urging said discs into engagement with each other, and characterized further by the addition of means for disconnecting said discs from each other in opposition to said first named means.

13. In phonographic apparatus, the combination of a turntable, means for rotating said turntable, a feed screw extending over said turntable, a sound translating device carried by said feed screw for both longitudinal and rotational movement thereon relative to a record on said turntable, means including a pair of friction elements constituting a variable speed transmission arranged to variably rotate said feed screw in either one of two opposite directions whereby to correspondingly variably feed said device across said record in either one of two opposite directions at will, means coupling said turntable to the driving element of said transmission for delivering power thereto from said turntable, and means responsive to rotation of said device on said feed screw away from said record for disconnecting said elements and rendering them temporarily inoperative to rotate said feed screw while said turntable continues to rotate in response to said first named means.

JOHN J. HOEHN.
ARTHUR G. ZIMMERMAN.